R. E. HELLMUND.
SYSTEM OF CONTROL.
APPLICATION FILED SEPT. 9, 1915.

1,246,425.

Patented Nov. 13, 1917.
3 SHEETS—SHEET 1.

Acceleration Regeneration.

WITNESSES:

INVENTOR
Rudolf E. Hellmund.
BY
ATTORNEY

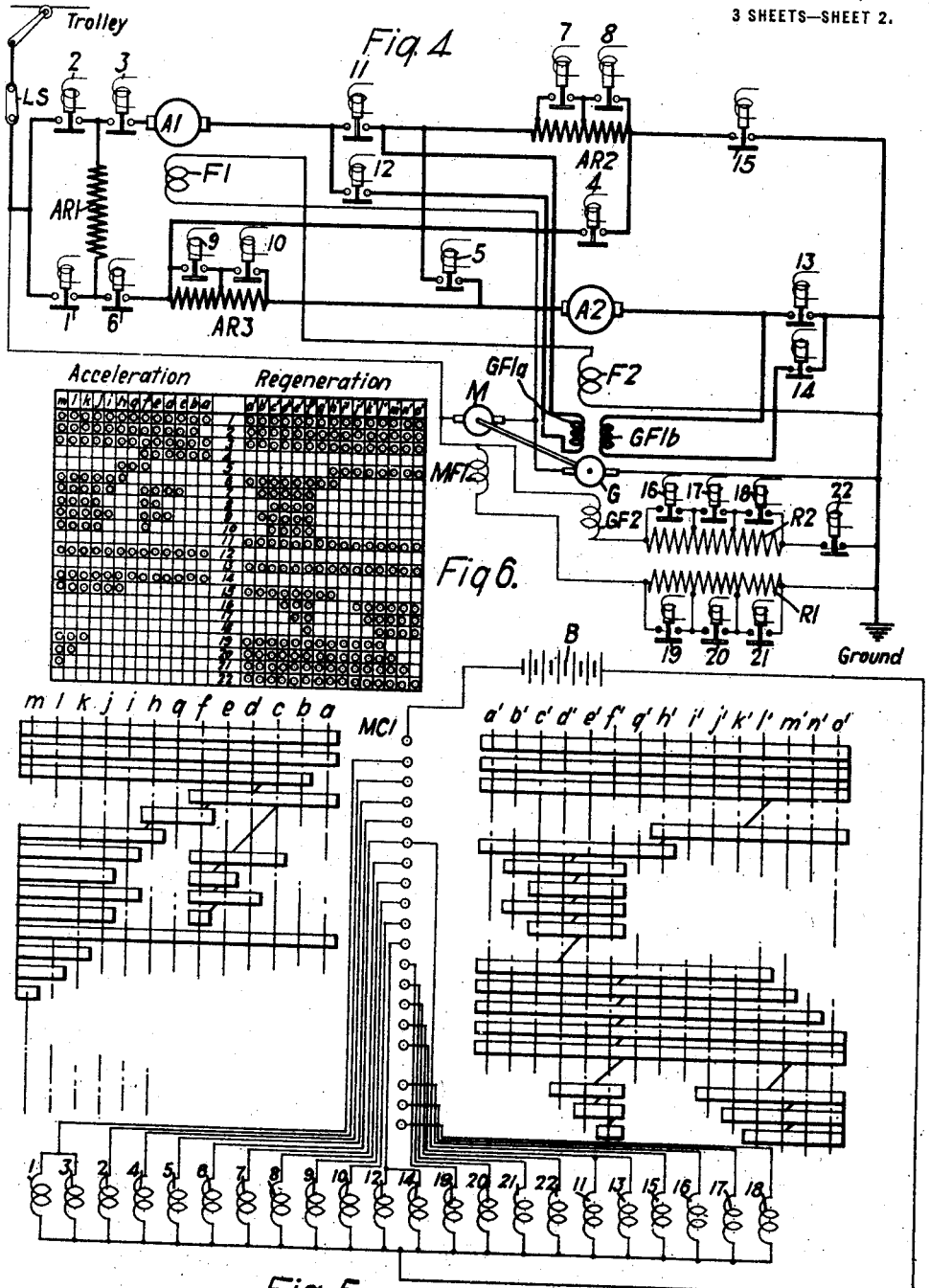

R. E. HELLMUND.
SYSTEM OF CONTROL.
APPLICATION FILED SEPT. 9, 1915.

1,246,425.

Patented Nov. 13, 1917.
3 SHEETS—SHEET 3.

WITNESSES:
R. J. Fitzgerald.
W. R. Coley

INVENTOR
Rudolf E. Hellmund.
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,246,425.  Specification of Letters Patent.  Patented Nov. 13, 1917.

Application filed September 9, 1915. Serial No. 49,751.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Systems of Control, of which the following is a specification.

My invention relates to systems of control, and it has special reference to the control of electric railway motors and the like that are adapted for regenerative operation.

The object of my invention is to provide a system of the above-indicated character which shall be simple and reliable in operation and wherein an auxiliary source of energy, such as a motor-generator, is employed in connection with both the acceleration and the regenerative operation of the main machine.

More specifically stated, the object of my invention is to provide, in a system of the class under consideration, a motor having a series-type field-magnet winding which is energized at all times, during both acceleration and regeneration, by a motor-generator or its equivalent, the arrangement of parts being such, however, that, although the main motor is shunt-excited, a series characteristic is imparted thereto.

According to my present invention, I provide a motor having a series-type field-magnet winding that is connected directly across the generating armature winding of a motor-generator or the like, an accelerating resistor and means for suitably varying the operation of the motor-generator and for manipulating the accelerating resistor to govern the main machine during both acceleration and regeneration, in the manner hereinafter more fully set forth.

Figure 1:
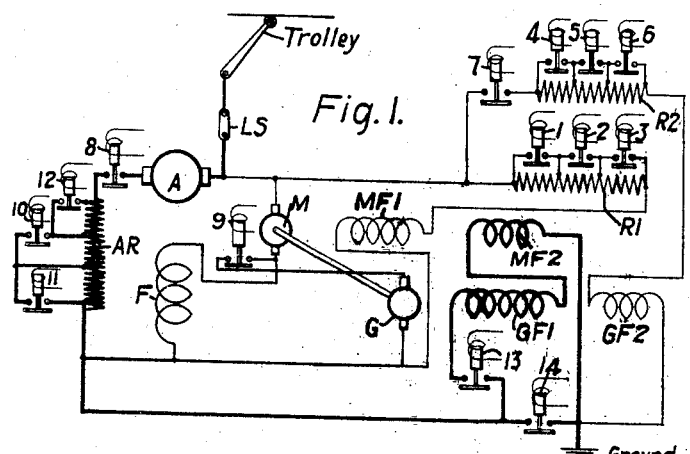
Figure 2:
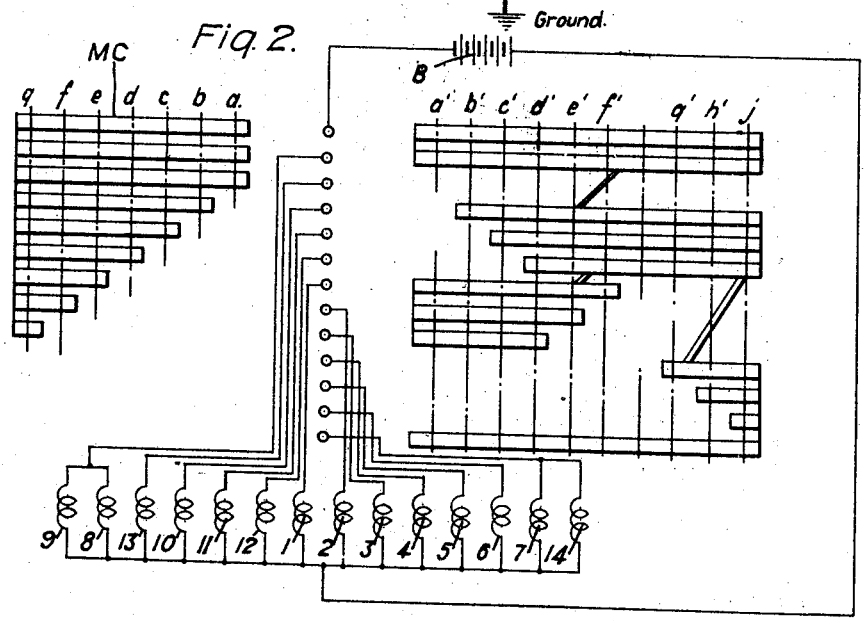
Figure 3:
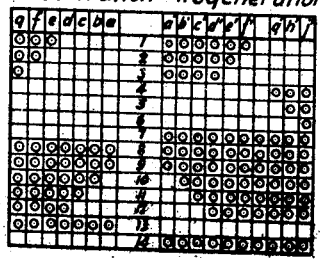
Figure 7:
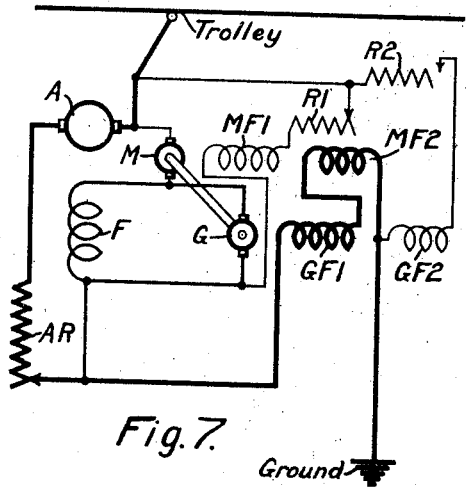
Figure 9:
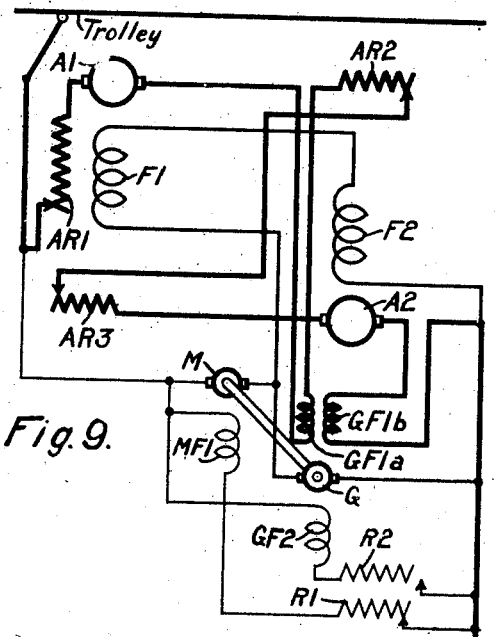
Figure 8:
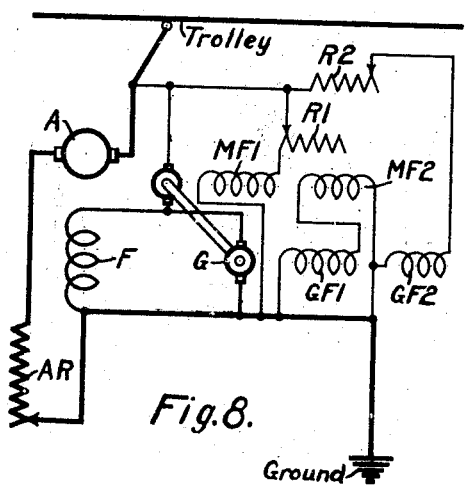
Figure 10:
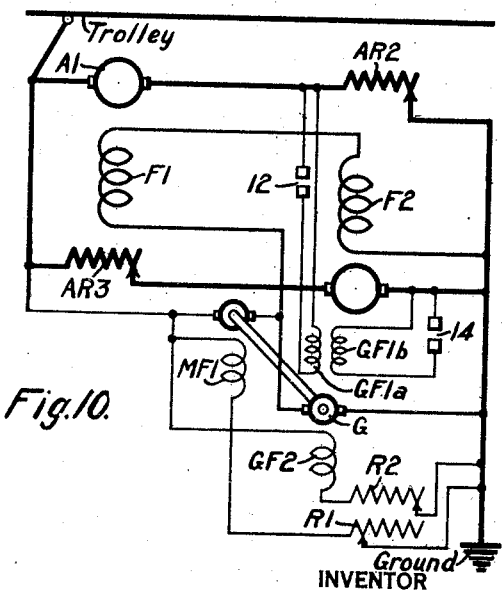

In the accompanying drawing, Figure 1 is a diagrammatic view of the main circuits of a system of control embodying my invention; Fig. 2 is a diagrammatic view of an auxiliary governing system which may be employed for manipulating the switches illustrated in Fig. 1 in accordance with the sequence chart of well-known form, as shown in Fig. 3; Figs. 4, 5 and 6 are views that correspond, respectively, to Figs. 1, 2 and 3 and illustrate a modification of my invention; Fig. 7 and Fig. 8 are simplified diagrammatic views corresponding to Fig. 1 and respectively illustrating the accelerating and the regenerative circuit connections; and Fig. 9 and Fig. 10 are similar views corresponding to Fig. 4 and respectively showing the circuit connections for series acceleration and parallel regeneration.

Referring to Fig. 1, the system shown comprises a plurality of supply-circuit conductors respectively marked Trolley and Ground, a main dynamo-electric machine having an armature A and a series-type field-magnet winding F, and an auxiliary motor-generator or dynamotor having a plurality of mechanically associated armature windings M and G that are electrically associated with the main machine in a manner to be described, a plurality of main-circuit switches LS, 8, 9, 13 and 14, and an accelerating resistor AR that is disposed in series-circuit relation with the main machine armature A and the sections of which are respectively adapted to be short-circuited by switches 10, 11 and 12.

The armature winding M is connected in series-circuit relation with the main field winding F across the series-connected main armature A and the accelerating resistor AR, or, in other words, the series-related windings M and F are connected substantially directly to the supply-circuit conductors. The armature winding M is thus adapted to act in a voltage-reducing capacity by opposing the voltage of the main armature A. The armature winding G is connected directly through the switch 9 in parallel relation to the main field winding F. The surplus energy received by the armature winding M is, in this way, transformed to the lower voltage of the armature G which delivers such energy to the main field winding. A shunt field winding $MF^1$ for the armature winding M is connected, through a variable resistor $R^1$, substantially between the supply-circuit conductors, and a second field winding $MF^2$ for the armature winding M is connected in series circuit with a field-magnet winding $GF^1$ for the armature winding G through the switch 13 intermediate the negative conductor Ground and the lower-voltage terminal of the accelerating resistor AR. A shunt field winding $GF^2$ for the armature winding G is connected, through a variable resistor $R^2$ and a switch 7, to the supply-circuit conductors and is employed during regenerative operation of the system only. The series field windings $GF^1$ and $MF^2$ are employed only during the acceleration of the main machine and are adapted to be excluded from circuit during regenerative operation by the opening of the switch 13 and the closure of the switch 14. The field-circuit resistors $R^1$ and $R^2$ are shown as adapted to be short-circuited in sections by switches 1, 2 and 3, and 4, 5 and 6, respectively.

Referring briefly to the auxiliary governing system that is illustrated in Fig. 2, the system comprises the actuating coils for the various switches that are shown in Fig. 1, a master controller MC of a familiar type that is adapted to occupy a plurality of positions $a$ to $g$, inclusive, when operated in one direction that corresponds to acceleration of the main machine and is adapted to occupy a plurality of positions $a'$ and $i'$, inclusive, when operated in the opposite direction that corresponds to the regenerative operation of the main machine; and a suitable source of energy, such as a battery B, for supplying energy to the various actuating coils through the contact segments of the master controller.

It will be understood that the auxiliary governing system of Fig. 2 is shown for illustrative purposes only and that any other suitable type of control, such as that embodying a main-circuit controller having contact segments and control fingers that correspond to the various switches that are illustrated in Fig. 1, may be employed, if desired. Inasmuch as the system illustrated is simple and is familiar to those skilled in the art, no detailed description thereof is deemed necessary, and only the operation of the main-circuit switches, taken in connection with the sequence chart of Fig. 3, will be given here.

Assuming that it is desired to accelerate the main dynamo-electric machine, the master controller MC may be moved to its initial position $a$, whereby the switches 8, 9 and 13 are closed. The main machine armature A is thus connected to the supply circuit through the entire accelerating resistor AR and the auxiliary series field windings $GF^1$ and $MF^2$, while the armature winding G is connected across the main field winding F.

As the master controller is moved through the next positions $b$, $c$ and $d$, the switches 10, 11 and 12 are successively closed, thereby gradually short-circuiting the accelerating resistor AR and correspondingly increasing the speed of the main machine armature A.

Upon actuation of the master controller to its subsequent positions $e$, $f$ and $g$, the switches 1, 2 and 3 are successively closed, thereby gradually short-circuiting the auxiliary field-circuit resistor $R^1$. In this way, the current traversing the shunt field winding $MF^1$ is gradually increased, whereby the speed of the motor-generator or dynamotor is correspondingly reduced, and the voltage impressed upon the main field winding F from the auxiliary armature winding G is accordingly decreased to effect an increase in the speed of the main dynamo-electric machine, in accordance with familiar principles.

Assuming that it is desired to effect regenerative operation of the system, the master controller MC may be moved to its initial regenerative position $a'$, whereby the switches 1, 2, 3, 7, 8, 9 and 14 are closed. The armature winding M is thus provided with a relatively strong field excitation by reason of the complete short-circuit of the resistor $R^1$ and, consequently, the motor-generator or dynamotor operates at a relatively low speed. The auxiliary series field windings $GF^1$ and $MF^2$ are excluded from circuit by reason of the closure of the switch 14, the switch 13 being open, while the shunt field winding $GF^2$ is connected in circuit with the entire resistor $R^2$.

As the speed of the main machine decreases, the sections of the resistor AR are successively short-circuited by the closure of the switches 10, 11 and 12 as the master controller is moved through its positions $c'$, $d'$ and $e'$, respectively, to maintain a substantially constant regenerated current, as will be understood.

In positions $e'$, $f'$ and the transition position intermediate the positions $f'$ and $g'$, the switches 3, 2 and 1 are successively opened, thereby decreasing the excitation of the auxiliary field winding $MF^1$, correspondingly increasing the speed of the motor-generator or dynamotor and, consequently, increasing the voltage impressed upon the terminals of the main field winding F from the armature winding G.

When the master controller is moved to its final positions $g'$, $h'$ and $i'$, the switches 4, 5 and 6 are successively closed, thereby gradually short-circuiting the field-circuit resistor $R^2$. In this way, the voltage of the armature winding G is directly increased by the corresponding increase of the current traversing the field winding $GF^2$, whereby the energization of the main field winding F is still further increased.

It will be noted that, whereas the main dynamo-electric machine is entirely shunt-excited and does not require the usual reversal of the electrical relations of the main armature A and the main field winding during regeneration, a series characteristic is imparted to the main machine under accelerating conditions, inasmuch as the field winding $GF^1$ of the armature winding G is connected in series-circuit relation with the main armature A. The series field winding $MF^2$ for the armature winding M may be omitted, if desired, but, when employed, is preferably differentially connected with respect to the shunt field winding $MF^1$ of the armature M, whereby a relatively steep series characteristic of the main motor may be obtained, that is to say, a relatively small change of accelerating current will effect a relatively large variation of the main motor speed, a condition which is often desirable, as will be understood.

Moreover, the system described lends itself particularly to the prevention of flash-over troubles of the main machine. It will be noticed that, during acceleration, the auxiliary armature winding M is, for the most part, shunt-excited, while the armature winding G is entirely series-excited. Consequently, in case of a sudden reëstablishment of the supply-circuit voltage after a temporary interruption thereof the main machine will not tend to flash-over, inasmuch as the field flux distortion thereof is not excessive, for the following reasons. Upon the resumption of supply-circuit energy, considerable time, comparatively speaking, will elapse before the shunt field winding $MF^1$ builds up to its normal excitation, partially because of its own relatively high self-induction and partially because such building up is counteracted by a relatively heavy current in the series winding $MF^2$, which is differentially connected with respect to the field winding $MF^1$.

On the other hand, the series field winding G will have its normal excitation built up with relatively great rapidity and, consequently, the voltage of the armature winding G and of the parallel-related main field winding F will attain a relatively large value, simultaneously with the relatively low-voltage conditions obtaining in the armature winding M. The sudden resumption of supply-circuit voltage, consequently, finds the energization of the main field winding F at or above the normal value, and field flux distortion, by reason of the sudden rush of current through the armature A, of relatively low self-induction, does not become excessive, and flash-over conditions are prevented. Furthermore, in the case of very short supply-circuit voltage interruptions, the main machine armature A will tend to maintain the shunt excitation of the main field winding F for a short period of time by reason of the self-inductive effect of the field winding and, therefore, upon resumption of the supply-circuit energy, the main machine field flux still exists in nearly its full strength, thereby again tending to prevent excessive field-flux distortion and flash-over troubles.

If the supply-circuit energy interruption is of relatively long duration, so as to permit the motor-generator or dynamotor to come to a standstill, suitable arrangements may be made to automatically open the switch 9 that connects the main field winding F to the armature winding G, as fully shown and described in my copending application, Serial No. 863,504, filed Sept. 25, 1914. Consequently, upon the reëstablishment of the supply-circuit voltage, the armature winding M has substantially zero counter-electromotive force, and a relatively large current will traverse the main field winding F to again prevent the undesirable field-flux distortion already referred to. The advantage of having the main machine shunt-excited, in the manner described, resides in its inherent stability and non-sensitiveness to supply-circuit voltage fluctuations, as will be understood.

Reference may now be had to Fig. 4, which discloses the use of my invention in connection with a series-parallel system of control of two main motors. The system illustrated comprises the supply-circuit conductors Trolley and Ground, a plurality of main dynamo-electric machines respectively having armatures $A^1$ and $A^2$ and series-type field-magnet windings $F^1$ and $F^2$; an auxiliary motor-generator or dynamotor embodying the armature windings M and G; a plurality of main-circuit switches 1, 2, 3, 4, 5, 6, 11, 12, 13, 14 and 15, a main-circuit resistor $AR^1$ that is adapted to be short-circuited by the simultaneous closure of switches 1 and 2, a second main-circuit resistor $AR^2$, the sections of which are respectively adapted to be short-circuited by switches 7 and 8, and a third main-circuit resistor $AR^3$, the sections of which are respectively adapted to be short-circuited by switches 9 and 10. The armature winding M is again provided with the shunt-connected field-magnet winding $MF^1$ that is disposed in series relation with the resistor $R^1$ across the supply circuit, while the armature winding G is provided with the shunt-connected field winding $GF^2$ that is connected to the supply-circuit in series-circuit relation with the variable resistor $R^2$. A series field winding for the armature winding G is provided during acceleration of the main motors and comprises two portions $GF^1a$ and $GF^1b$, the former being adapted to be short-circuited by the simultaneous closure of switches 11 and 12 while the other portion is adapted to be short-circuited by the simultaneous closure of switches 13 and 14. The resistor $R^1$ is adapted to be short-circuited in sections by a plurality of switches 19, 20 and 21 while the resistor $R^2$ is adapted to be similarly varied by a plurality of switches 16, 17 and 18.

The auxiliary governing system shown in Fig. 5 comprises the actuating coils of the various switches that are illustrated in Fig. 4, a master controller $MC^1$ that is adapted to occupy a plurality of operative positions $a$ to $m$, inclusive, when moved in one direction that corresponds to acceleration of the main machines and is adapted to occupy a plurality of positions $a'$ to $o'$, inclusive, when actuated in the reverse direction that corresponds to regenerative operation, and the battery B or other suitable source of energy for energizing the various actuating coils in accordance with the sequence chart shown in Fig. 6.

It will be understood, as mentioned in connection with Fig. 2, that any other suitable type of control system, such as that embodying a main-circuit controller, may be employed in place of the system illustrated in Fig. 5.

Assuming that it is desired to effect acceleration of the main motors, the master controller $MC^1$ may be moved to its initial accelerating position $a$, whereby the swtiches 1, 3, 4, 12 and 14 are closed. The main motor armatures $A^1$ and $A^2$ are thus connected in series-circuit relation with all of the resistors $AR^1$, $AR^2$ and $AR^3$ and with the auxiliary series field-winding portions $GF^1a$ and $GF^1b$ across the supply circuit. Thus, the excitation of the auxiliary armature winding G is influenced by the currents traversing both main armatures during both series and parallel relation thereof to correspondingly vary the main field excitation. In position $b$ of the master controller, the switch 2 is closed, thereby short-circuiting the resistor $AR^1$ and effecting a certain degree of acceleration of the main motors.

Upon actuation of the master controller to its position $c$, the switch 7 is closed, thereby short-circuiting a section of the resistor $AR^2$.

In positions $d$, $e$, and $f$ of the master controller, the switches 9, 8 and 10 are successively closed, whereby both sections of the resistor $AR^3$ and the remaining section of the resistor $AR^2$ are successively excluded from circuit. In position $f$, the switch 5 is also closed, thereby directly connecting the armature windings $A^1$ and $A^2$ and completely short-circuiting the series-connected resistors $AR^2$ and $AR^3$, in accordance with familiar practice. In position $g$, the switches 4, 7, 8, 9 and 10 are opened, and, in position $h$, the switches 6 and 15 are closed, whereupon the switch 5 is opened. In this way, the main motor armatures are disposed in parallel-circuit relation, with the resistors $AR^2$ and $AR^3$ in the respective circuits, in accordance with the well-known "bridging" transition.

In positions $i$, $j$ and $k$, the resistors $AR^2$ and $AR^3$ are gradually short-circuited in a manner identical with that already described, and, in position $k$, the switch 19 is also closed. In the final positions $l$ and $m$, the switches 20 and 21 are closed, thus gradually short-circuiting the resistor $R^1$ and increasing the excitation of the shunt field winding $MF^1$ for the purpose described in connection with the system shown in Fig. 1.

Assuming that it is desired to effect regenerative operation of the system, the master controller may be moved to its initial regenerative position $a'$, wherein the switches 1, 2, 3, 6, 11, 13, 15, 19, 20, 21 and 22 are closed. The main momentum-driven armatures $A^1$ and $A^2$ are thus connected in parallel-circuit relation, with the resistor $AR^1$ and the series field winding portions $GF^1a$ and $GF^1b$ short-circuited, while the resistors $AR^2$ and $AR^3$ are included in circuit with the respective armatures. The field winding $MF^1$ is excited to its strongest value, for the purpose hereinbefore described. In position $b'$ and $c'$ of the master controller, the switches 7 and 9, and 8 and 10, respectively, are short-circuited to gradually effect the exclusion of the resistors $AR^2$ and $AR^3$ from the regenerative circuit.

In positions $d'$, $e'$ and $f'$ the switches 16, 17 and 18 are successively closed, thus gradually short-circuiting the resistor $R^2$, whereby the excitation of the field winding $GF^2$ is correspondingly increased, and the voltage impressed upon the main field windings $F^1$ and $F^2$ by the armature winding G is accordingly increased.

In position $g'$ of the master controller, the switches 7, 8, 9, 10, 16, 17 and 18 are opened, while, in position $h'$, the switch 5 is closed, whereby the transition of the main machine armatures from parallel to series connection is begun. In position $i'$, the switches 6 and 15 are opened and the main machine armatures are disposed in series-circuit relation across the supply circuit. The main armatures are thus temporarily connected in local circuits including the various main-circuit resistors, and then are directly connected in series relation, the resistors being open-circuited. After the completion of the transition referred to, the master controller may be actuated through its positions $j'$, $k'$ and $l'$, whereby the switches 16, 17 and 18 are successively closed to gradually short-circuit the resistor $R^2$ and indirectly increase the excitation of the main field windings $F^1$ and $F^2$. In the final positions $n'$, $m'$ and $o'$ of the master controller, the switches 19, 20 and 21 are successively opened, thus gradually weakening the excitation of the shunt field winding $MF^1$ and, consequently, increasing the speed of the motor-generator or dynamotor, whereby a further increase of the excitation of the main field windings F¹ and F² occurs to counteract the results of the gradual decrease in speed of the main machines and to maintain the desired substantially constant regenerated current.

Although I have shown and described my invention as excluding the auxiliary field winding GF¹, or its equivalent, from circuit during regeneration, it will be understood that, in some instances, it may be desirable to employ the winding connected differentially with respect to the shunt field winding GF² for the purpose of obtaining a negative compound effect during regeneration to maintain a substantially constant regenerated current, as fully described in my copending application, Serial No. 855,539, filed Aug. 7, 1914.

Obviously, various modifications may be made in the circuit connections and arrangement of parts herein set forth without departing from the spirit and scope of my invention and I desire, therefore, that only such limitations shall be imposed as are indicated in the appended claims.

I claim as my invention:

1. In a system of control, the combination with a main dynamo-electric machine having an armature and a field-magnet winding, of a plurality of auxiliary armature windings, means for connecting one of said auxiliary armature windings across said main field winding, a field winding for each auxiliary armature winding, and means for including said last field windings in series-circuit relation with the main armature, and excluding them from such circuit, under predetermined conditions.

2. In a system of control, the combination with a main dynamo-electric machine having an armature and a field-magnet winding, of a plurality of auxiliary armature windings, means for connecting one of said auxiliary armature windings across said main field winding, a variable resistor in series-circuit relation with the main armature, means for connecting the auxiliary armature windings in series-circuit relation across said main armature and said resistor, a field winding for each auxiliary armature winding, and means for including said last field windings in series-circuit relation with the main armature, and excluding them from such circuit, under predetermined conditions.

3. In a system of regenerative control, the combination with a main dynamo-electric machine having an armature and a series-type field-magnet winding, of a plurality of auxiliary armature windings, means for exciting said field winding from one of said auxiliary armature windings to effect shunt excitation of the main machine during both the accelerating and regenerating periods thereof, and means for regulating the excitation of the main field winding.

4. In a system of regenerative control, the combination with a supply circuit and a main dynamo-electric machine having an armature and a series-type field-magnet winding, of a plurality of mechanically associated auxiliary armature windings, means for connecting one of said auxiliary windings, as a motor, to the supply circuit, means for connecting the other auxiliary winding, as a generator, to said main field winding to effect shunt excitation of the main machine during both the accelerating and the regenerating periods thereof, and means for varying the speed and energization of said auxiliary armature windings to regulate the excitation of the main field winding.

5. In a system of regenerative control, the combination with a supply circuit and a main dynamo-electric machine having an armature and a series-type field-magnet winding, of a plurality of mechanically associated auxiliary armature windings, means for connecting one of said auxiliary windings, as a motor, to the supply circuit, means for connecting the other auxiliary winding, as a generator, to said main field winding to effect shunt excitation of the main machine during both the accelerating and the regenerating periods thereof, and a field-magnet winding for at least one of the auxiliary windings connected in series-circuit relation with the main machine armature under predetermined conditions.

6. In a system of regenerative control, the combination with a supply circuit and a main dynamo-electric machine having an armature and a series-type field-magnet winding, of a plurality of mechanically associated auxiliary armature windings, means for connecting one of said auxiliary windings, as a motor, to the supply circuit, means for connecting the other auxiliary winding, as a generator, to said main field winding to effect shunt excitation of the main machine during both the accelerating and the regenerating periods thereof, a plurality of field-magnet windings for the auxiliary armature windings connected in series-circuit relation with the main machine armature, and means for excluding said last field windings from circuit under regenerative conditions only.

7. In a system of regenerative control, the combination with a main dynamo-electric machine having an armature and a series-type field-magnet winding, of a plurality of mechanically associated auxiliary armature windings, means for connecting one of said auxiliary windings to excite said main field winding, a variable resistor in series-circuit relation with the main armature, means for connecting the auxiliary armature windings in series-circuit relation across said main armature and said resistor, a field winding for each auxiliary winding connected in series-circuit relation with the main armature, means for including said last field windings in circuit only during accelerating conditions of the main machine, means for varying the operation of said auxiliary windings, and means for varying said resistor to regulate the accelerating and regenerating operation of the main machine.

8. In a system of control, the combination with a supply circuit, and a plurality of dynamo-electric machines severally having armatures and field-magnet windings, of means for connecting said armatures in parallel relation during the initial portion of the regenerative period, and means for effecting subsequent connection of the regenerating armatures in series relation, said last means including the direct series connection of the armatures, the substantially simultaneous disconnection of the first armature from one supply-circuit conductor and the disconnection of the second armature from the other supply-circuit conductor.

9. In a system of control, the combination with a direct-current supply circuit, and a plurality of dynamo-electric machines severally having armatures and field-magnet windings, of a plurality of variable translating devices, means for connecting said armatures in series relation with the respective devices, means for connecting the armature circuits in parallel relation during the initial portion of the regenerative period, and means for effecting subsequent connection of the regenerating armatures in series relation, said last means including the connection of each armature in a local circuit with the non-corresponding translating device and the substantially simultaneous disconnection of the first device from the negative supply-circuit conductor and the disconnection of the second device from the positive supply-circuit conductor to dispose the main armatures in direct series relation.

10. In a system of regenerative control, the combination with a direct-current supply circuit, and a plurality of dynamo-electric machines severally having armatures and field-magnet windings, of a plurality of variable resistors, an auxiliary exciting armature winding connected across the main field windings, means for connecting the main armatures in series relation with the respective resistors, means for connecting the armature circuits in parallel relation during the initial portion of the regenerative period, and means for effecting subsequent connection of the regenerating armatures in series relation, said last means including means for varying the auxiliary armature-winding voltage to decrease the main field excitation, means for connecting each armature in a local circuit with the non-corresponding resistor, means for substantially simultaneously disconnecting the first resistor from the negative supply-circuit conductor, and means for disconnecting the second resistor from the positive supply-circuit conductor to dispose the main armatures in direct series relation.

11. In a system of control, the combination with a supply circuit and a plurality of main dynamo-electric machines severally having armatures and field-magnet windings, of an auxiliary exciting armature winding connected across the main field windings, means for effecting connections of the main armatures in both series and parallel relation, and means associated with said auxiliary armature winding for varying the voltage thereof in accordance with current variations in either main armature.

12. In a system of control, the combination with a supply circuit and a plurality of main dynamo-electric machines severally having armatures and field-magnet windings, of an auxiliary exciting armature winding connected across the main field windings, means for effecting connections of the main armatures in both series and parallel relation, and a plurality of field windings for said auxiliary armature winding respectively connected in circuit with the main armatures, whereby variations of current in either main armature influence said auxiliary armature winding to correspondingly vary the main field excitation.

13. In a system of control, the combination with a main dynamo-electric machine having an armature and a field-magnet winding, of a plurality of auxiliary armature windings connected in parallel relation to the main armature circuit, and means for connecting the main field winding across one of the auxiliary windings.

14. In a system of control, the combination with a main dynamo-electric machine having an armature and a field-magnet winding, of a variable translating device connected in series relation with the main armature, a plurality of auxiliary armature windings connected in parallel relation to the circuit including said main armature and said translating device, and means for connecting the main field winding in parallel relation to one of the auxiliary windings and in series relation to another.

15. In a system of control, the combination with a main dynamo-electric machine having an armature and a field-magnet winding, of a plurality of auxiliary armature windings connected in parallel relation to the main armature circuit, means for connecting the main field winding across one of the auxiliary windings, and means for varying the relative voltages of the auxiliary windings.

16. In a system of control, the combination with a main dynamo-electric machine having an armature and a series-type field-magnet winding, of auxiliary means connected in series relation with the main field winding across the main armature to oppose the voltage thereof, and to receive energy, means for transforming such energy to a lower voltage, and means for delivering the transformed energy to the main field winding.

In testimony whereof, I have hereunto subscribed my name this 31st day of August, 1915.

RUDOLF E. HELLMUND.

Copies of this patent may be obtained for five cents each, by addressing the "Commissioner of Patents, Washington, D. C."